United States Patent [19]
Eubank

[11] 3,855,814
[45] Dec. 24, 1974

[54] MOBILE HOME ADAPTED FOR EXTERNALLY MOUNTED AIR CONDITIONING UNIT AND UNIT THEREFOR

[76] Inventor: Marcus P. Eubank, Box 7576, Longview, Tex. 75601

[22] Filed: Mar. 21, 1974

[21] Appl. No.: 453,412

Related U.S. Application Data

[63] Continuation-in-part of Ser. No. 361,975, May 21, 1973, abandoned.

[52] U.S. Cl.............. 62/244, 62/239, 62/237, 165/42, 62/236, 98/10
[51] Int. Cl............................................. B60h 3/04
[58] Field of Search............ 62/237, 239, 244, 236; 165/41, 42, 44; 98/10

[56] References Cited
UNITED STATES PATENTS

| | | | |
|---|---|---|---|
| 2,091,594 | 8/1937 | Innes | 165/44 |
| 2,620,636 | 12/1952 | Stanton | 62/237 |
| 2,737,780 | 3/1956 | Curell | 62/244 |
| 2,815,938 | 12/1957 | Impey | 98/10 |

FOREIGN PATENTS OR APPLICATIONS

| | | | |
|---|---|---|---|
| 1,084,327 | 7/1954 | France | 62/237 |

Primary Examiner—William J. Wye
Attorney, Agent, or Firm—Wofford, Felsman, Fails & Zobal

[57] ABSTRACT

An improvement in a conventional mobile home having supply and return distribution ducts for circulating air therewithin characterized by a mounting means on an external frame for subsequently mounting an external air conditioning unit; and the respective supply and return ducts have respective external connection means that are normally covered by caps prior to the installation of the air conditioning unit. The external frame may be integral with or removable from the main mobile home substructure and may comprise the tongue or another external frame. A matching air conditioning unit may thereafter be mounted and connected onto the external connection means without requiring expensive, difficultly obtainable skilled help, such as air conditioning specialists in hot weather. Also, the mobile home may have suitable fresh air vent, downcomer and powered blower for circulating fresh air through the attic and reducing the heat load on the ceiling of the mobile home. Also disclosed are specific structural details.

11 Claims, 10 Drawing Figures

PATENTED DEC 24 1974
3,855,814
SHEET 1 OF 2
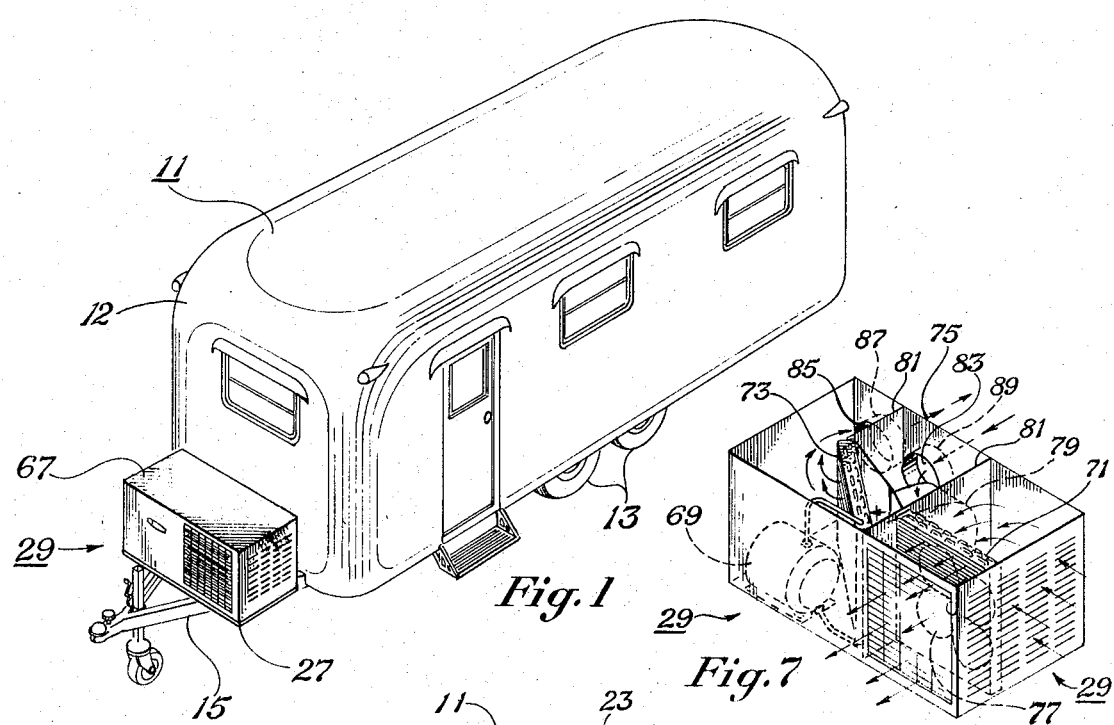
Fig.1
Fig.7
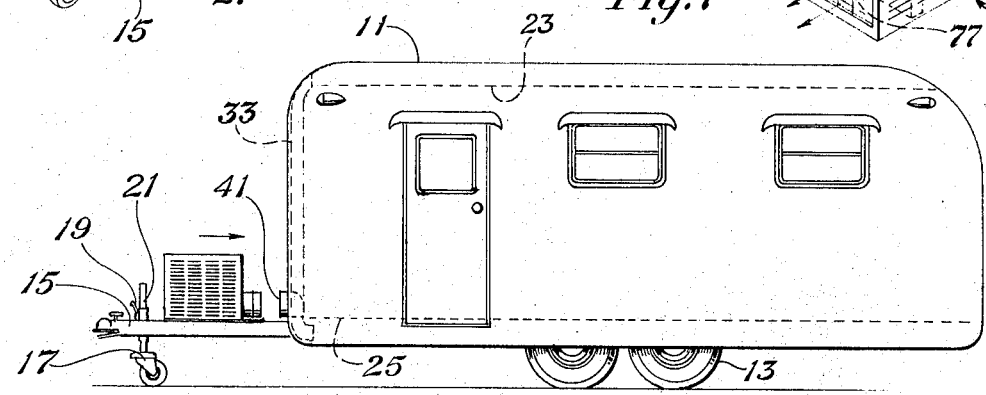
Fig.2
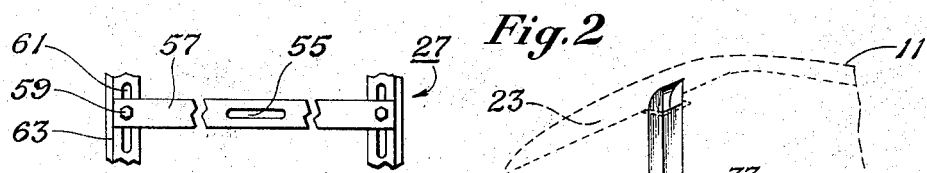
Fig.5
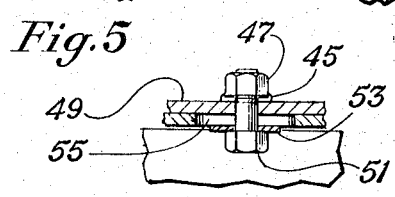
Fig.4
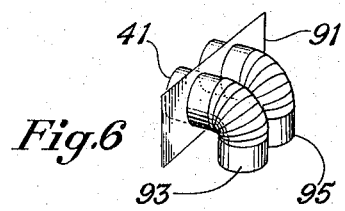
Fig.6
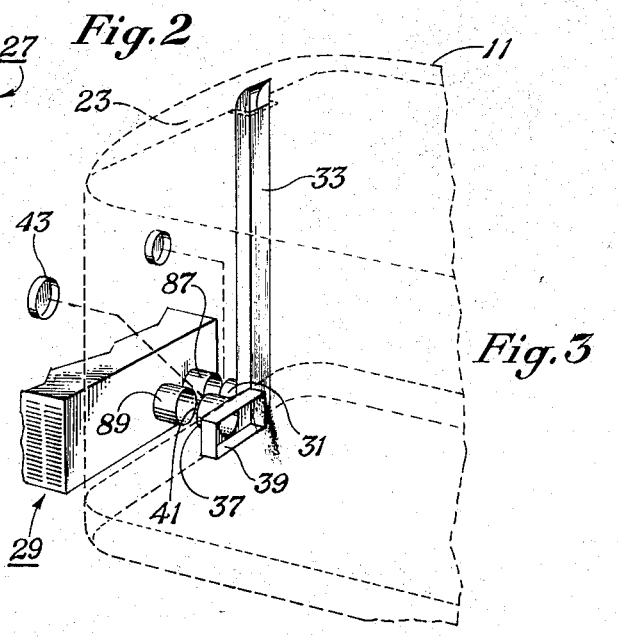
Fig.3

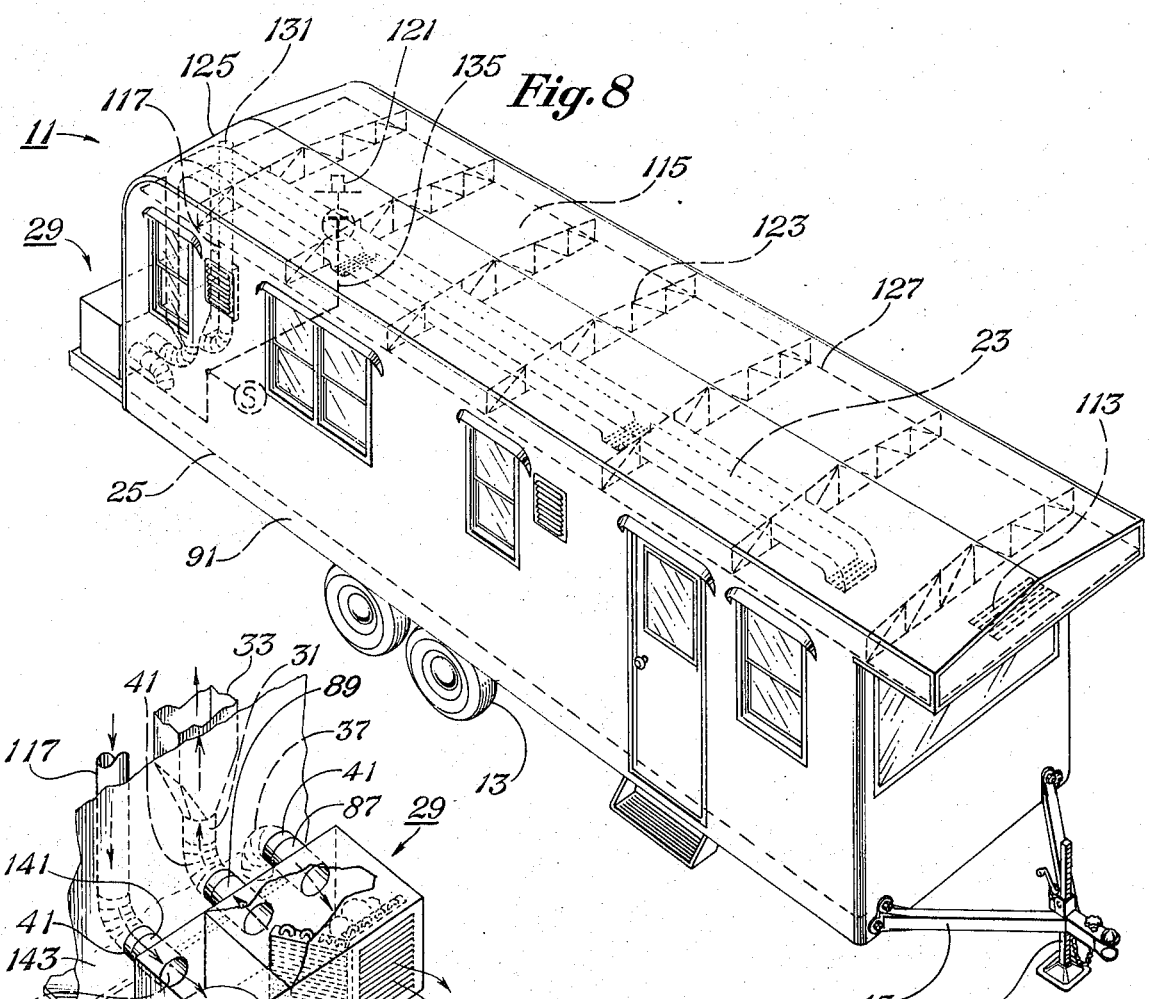
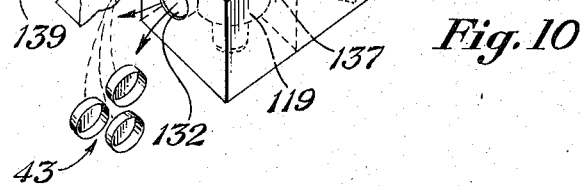
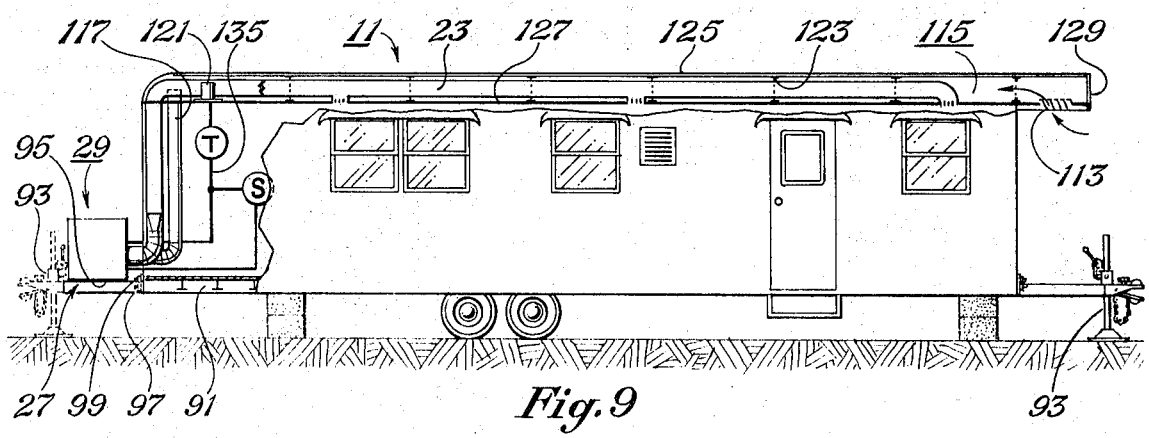

MOBILE HOME ADAPTED FOR EXTERNALLY MOUNTED AIR CONDITIONING UNIT AND UNIT THEREFOR

CROSS REFERENCE TO RELATED APPLICATIONS

This application is a continuation-in-part of an earlier filed and co-pending patent application Ser. No. 361,975, filed May 21, 1973 now abandoned and entitled "Mobile Home Adapted for Tongue Mounted Air Conditioning Unit and Unit Therefor."

BACKGROUND OF THE INVENTION

1. Field of the Invention:

This invention relates to mobile homes and air conditioning systems therefor. In a specific aspect, this invention relates to air conditioning systems for mobile homes incorporating apparatus for economically reducing the heat load on a mobile home for reduced cost of operating the air conditioning unit.

2. Description of the Prior Art:

Many and diverse approaches have been employed for air conditioning homes. With the advent of the increase in sales of mobile homes, the problem of the severe heat load and the relatively thin insulation in different panels of the mobile home accentuates the problem of reducing the heat load. In my co-pending application Ser. No. 306,169, filed Nov. 13, 1972, entitled "Reverse Roof Ventilation for Mobile Home" now Pat. No. 3,807,290, I described one method of economically reducing the heat load on such mobile homes. Even with such an improved method for economically reducing the heat load, there is still a problem of adequately cooling or heating a home when it is moved into a climate having more extreme temperature variation than that for which it was designed, or purchased.

Moreover, the mobile homes have become very comfortable, but are commensurately more expensive than they were initially. Accordingly, many families who are able to afford a relatively plain mobile home may not be able to afford an air conditioning system at the time they purchase the mobile home. When the family is subsequently able to afford an air conditioning unit, there is a great deal of expense to installing the air conditioning unit. Heretofore, such installations have required additional later-added bracing, or separate scaffolding to support the compressor and condenser section, as well as the expense of installing tubing and evaporator section in a conventional home air circulation system. Where air conditioning units were installed in a side wall, roof or beneath a mobile home, there was the noise, taking up of floor space or the like. Where an outside unit was installed on the ground beside the trailer, there was the disadvantage of having the noise and the blowing of the hot air onto the neighbor's trailer house or the like. Moreover, such ground units were subject to flooding in the event of even slightly high water in a trailer park or the like. If an air conditioning unit were installed on a home in an overhead structure, aside from requiring additional bracing in the roof of the mobile home, there was the danger of hitting the air conditioning unit on overpasses or the like. If installed on the side of the unit, the mobile home could not pass highway specifications and could not be towed down the highway, requiring cumbersome removal of the unit, scaffolding, bracing and the like. Moreover, if the subsequent installation of the air conditioning unit is to be made during hot weather, there is a scarcity of skilled labor, such as an air conditioning specialist, so there is additional inconvenience and expense involved over that which would ordinarily be necessary.

Thus, insofar as I am aware, the prior art has not provided a combination of a mobile home into which an air conditioning unit may be installed by a simple expedient and without requiring artificially high installation costs; such as, skilled labor, additional later-added bracing, additional duct work and the like. Moreover, the prior art has not provided a system that could be installed conveniently on a mobile home once the mobile home has been built; without one or more of the objections delineated hereinbefore.

Accordingly, it is an object of this invention to provide a mobile home having means for enabling economical subsequent installation of a specially adapted air conditioning unit; as well as an air conditioning unit that is so adapted; that obviates the disadvantages of the prior art.

It is a specific object of this invention to provide a mobile home that can be bought with Spartan furnishings and into which an air conditioning unit can be subsequently installed and inexpensively operated, yet still obviate the disadvantages of the prior art and conserve energy.

These and other objects will become apparent from the descriptive matter hereinafter, particularly when taken in conjunction with the drawings.

BRIEF DESCRIPTION OF THE DRAWINGS

FIG. 1 is an isometric view of a mobile home employing this invention.

FIG. 2 is a side elevational view of the embodiment of FIG. 1.

FIG. 3 is a partial schematic view illustrating one embodiment of this invention for connecting the air conditioning unit with the air circulation system inside the mobile home.

FIG. 4 is a partial side elevational view of a retainer means and a mounting means for mounting the air conditioning unit on the tongue of the mobile home.

FIG. 5 is a partial plan view of an adjustable portion of a mounting means facilitating attainment of alignment of a retainer means of the air conditioning unit.

FIG. 6 is a partial isometric view of a mounting panel for insertion in the front end of a mobile home in accordance with another embodiment of this invention.

FIG. 7 is a partial isometric view, partly schematic, showing an air conditioning unit in accordance with one embodiment of this invention.

FIG. 8 is an isometric view of a mobile home employing another embodiment of this invention.

FIG. 9 is a partial cross sectional view, partly schematic, of the embodiment of FIG. 8.

FIG. 10 is a partial isometric view, partly schematic, showing an air conditioning unit similar to FIG. 7 and having an additional powered blower for effecting attic circulation of fresh air, thereby conserving energy and cost.

DESCRIPTION OF PREFERRED EMBODIMENTS

This invention is best described by first describing a simplified special case, such as illustrated in FIGS. 1–6; and thereafter expanding to the more generic case and other embodiments.

Referring to FIGS. 1 and 2, the mobile home 11 may be of conventional construction, except as noted hereinafter. The mobile home 11 has a body 12 with a conventional main substructure (not shown), a plurality of wheels 13 for mobility and a tongue 15 for being towed. The mobile home may be mounted on the wheels by any of the conventional means, including the leaf springs or the like. As illustrated, the tongue 15 has a front support wheel 17. The front support wheel 17 is adjustable in height by way of suitable adjusting means, such as crank and pinion 19 and rack shaft 21. In accordance with usual practice, the attained height may be locked into position by conventional ratchet teeth and holder (not shown). In many of the new and larger mobile homes, in fact, the front and rear supports will comprise permanent blocks or the like that are installed in place in a trailer park.

The mobile home 11 has a conditioned air distribution means, such as the attic duct 23, FIG. 2, for circulating conditioned air. The mobile home 11 also has an air return means, such as sub-floor duct 25, for returning air that has been circulated. The mobile home 11 may have conventional heater and blower, as in a heating closet located internally of the mobile home; although they are not illustrated in FIGS. 1 and 2. With many of the smaller mobile home units, such as illustrated, the heating means may comprise wall heaters, such as panel ray heaters or the like that are fired by suitable means, such as electricity or bottle liquefied petroleum gases, like propane, butane, or propane-butane mixtures (LPG).

The foregoing elements are conventional and need not have amplified description thereof.

This invention, however, comprises an improvement of having a mounting means 27 on the tongue 15 for mounting an external air conditioning unit 29; a supply duct 31 and a return duct 37, FIG. 3, that are connected into the air circulation means for the mobile home and have respective external connection means 41, FIGS. 2 and 3, that are adapted for connection with an external air conditioning unit 29 that is subsequently installed. Such a subsequent installation is simple and may be readily made by the mobile home owner by simply mounting the air conditioning unit 29 on the tongue 15 via the mounting means 27 connecting the respective inlet and outlet ports of the air conditioning unit with the return and supply connection means.

As illustrated, a supply duct 31 is connected with the conditioned air supply distribution means, exemplified by vertically extending duct 33 that is vented into the attic duct 23. The attic duct 23 has a plurality of louvers or the like (not shown) for distributing the air into the respective rooms of the mobile home 11. Such louvers are conventional. Also the attic duct is conventional and may comprise simply the open space intermediate the ceiling and the roof and through open beams; or it may comprise a separate duct forming a plenum; the latter, particularly, where an inverse circulation through the attic is also employed, as described in my hereinbefore referenced application Ser. No. 306,169. The supply duct 31 may take any shape that will handle the volumetric rate of flow of air at the pressure differential that is able to be generated by an air circulation fan in the air conditioning unit 29. As illustrated, the supply duct 31 comprises a cylindrical duct to facilitate connecting it with the air conditioning unit.

A return duct 37 is connected with the return air means, such as the sub-floor duct 25. As illustrated, a return duct 37 has a rectangular aperture 39, FIG. 3, and swages down to a cylindrical duct to facilitate connection with the air conditioning unit. Both the return duct 37 and the supply duct 31 terminate exteriorly of the mobile home in respective connection means 41, FIG. 2.

As illustrated in FIG. 3, the plurality of external connection means 41 are covered by respective caps 43. If desired, the caps 43 may be insulated to minimize heat influx. Ordinarily, the caps 43 are retained in place on respective external connection means by suitable conventional means, such as sheet metal screws. In any event, the respective caps 43 are readily removed when it is desired to connect the air conditioning unit 29 into the air distribution system.

The mounting means 27 may comprise any suitable means for mounting the air conditioning unit 29 on the tongue 15. As illustrated, the mounting means 27 comprises a structural platform that is emplaced onto the tongue 15 by suitable conventional means, such as by welding. The platform may take the shape of a relatively solid platform with drain holes as well as holes for insertion of bolts or the like therethrough to bolt down the air conditioning unit 29. The drain holes will thus drain off any water that would tend to accumulate and prevent rusting at the interface between the bottom of the air conditioning unit 29 and the platform serving as the mounting means 27. Obtaining exact registry and alignment of apertures in the platform 27 and holes in nuts or the like that serve as retainer means 45, FIG. 4, in the air conditioning unit 29, requires careful quality control. Accordingly, it has been found preferable to employ a mounting means having adjustable, or adjustably positionable members, such as illustrated in FIGS. 4 and 5, in order to obtain alignment with the retainer means 45. As illustrated, a threaded nut 47 that has been welded to the bottom 49 of the air conditioning unit 29 is employed as the retainer means 45. A stud bolt 51 penetrating through washer 53 is screwed upwardly through slot 55 into the nut 47. The slot 55 is disposed in member 57, FIG. 5, and is slidably positioned by way of suitable nuts and bolts 59 in side slots 61 of the main structural member 63 of the mounting means 27. When the desired alignment and registry has been effected, the respective nuts and bolts 59 and stud bolt 51 are tightened down to retain the air conditioning unit 29 on the mounting means 27. If desired, lock washers may be employed to prevent loosening of the threadedly tightened elements due to vibration of the air conditioning unit 29.

As illustrated in FIGS. 1–3, the air conditioning unit 29 is mounted on the tongue via the mounting means 27. The air conditioning unit 29 is specially adapted for installation on the tongue of the mobile home 11 and, accordingly, has a weather-resistant cabinet 67 that encloses the self-contained unit. The cabinet 67 has adequate conventional structural supports and has the retainer means 45 for retaining it in place on the mounting means 27.

As indicated, the air conditioning unit 29 is a self-contained, closed system including a refrigerant, a compressor 69, FIG. 7 and a condenser coil 71 that is connected with the compressor for liquifying the compressed refrigerant gas. The air conditioning unit 29 also includes an evaporator coil 73 that is connected with the condenser coil 71 for evaporating the liquified refrigerant in heat exchange relationship with and simultaneously cooling the air that is circulated within the mobile home, indicated by the arrows 75. The air conditioning unit 29 has the evaporator coil 73 connected with the compressor for returning the evaporated refrigerant to the compressor for compression. If desired, liquid accumulators, safety controls and the like may be employed in the air conditioning unit 29, but such elements are sometimes dispensed with in the more economical air conditioning units. The cited elements of the air conditioning unit 29 are conventional and need not be described in detail herein. The air conditioning unit 29 also has a condenser fan 77 for circulating external air past the condenser coil for taking away the heat of the compressed refrigerant; and has an evaporator fan 79 for circulating the air to be circulated within the mobile home past the evaporator coil for cooling. If desired, the evaporator fan may comprise a conventional squirrel cage blower that is used as a supplement, or adjunct, to the normal air circulation means within the mobile home 11. An the other hand, the blower 79 may have sufficient design capacity to circulate the air completely through the mobile home 11. I have found it preferable to employ a powerful highspeed blower as the evaporator fan 79 in order to obtain a relatively high differential pressure and highspeed flow of air to obtain the requisite cooling without requiring uneconomically large evaporator coils. Similarly, I have found it desirable to employ relatively high flow, efficient condenser fans to prevent having to employ inordinately large condenser surfaces, particularly in the Southwestern United States where the daytime temperatures may run high. The cabinet 67 has internal baffles 81 and the like defining an internal conditioned air circulation path past the evaporator coil 73 and the evaporator fan 79 to ensure that the air flows serially through the evaporator coil 73 for cooling. The air conditioning unit also has respective inlet and outlet ports 83 and 85 that are disposed at the rear of the air conditioning unit 29 and spaced in relation to each other and to the respective retainer means 45 on the air conditioning unit so as to approximately align with the respective return and supply connection means 41 on the mobile home 11. Specifically, the inlet and outlet ports 83 and 85 are connected to the respective terminal ends of the internal conditioned air circulation path of the cabinet 67 and are connected by cylindrical ducts 87 and 89 with the respective connection means 41 on the supply duct 31 and the return duct 37, FIG. 3. Thus, it can be seen that the cylindrical ducts 87 and 89 serve as respective couplings for connecting the inlet and outlet ports 83 and 85 with the respective return and supply connection means 41 on the mobile home 11.

If desired, the air conditioning unit 29 may have filters emplaced therein. On the other hand, the conventional air circulation system and filter may be employed if desired to filter the air circulated within the home.

In operation, the mobile home is built in accordance with the usual procedures being employed. The conditioned air distribution means, such as the attic duct 23, however, is extended by means of suitable ducts, such as vertical duct 33 and supply duct 31, to provide an easily accessible, external supply connection means adjacent the tongue 15. Likewise, the sub-floor duct 25 is extended by way of return duct 37 and the rectangular aperture 39 to provide easily accessible external return connection means 41 adjacent the tongue 15. If the air conditioning unit 29 is not installed at the factory, the external connection means 41 are capped by respective caps 43. A mounting means 27 is provided on the tongue 15 for subsequent mounting of the external air conditioning unit 29. Thus, the mobile home owner may take his mobile home and live in it as long as he desires. At such time as he desires to add an air conditioning unit, he purchases one of the specially adapted air conditioning units. He may then simply: (1) remove the caps 43; (2) emplace the air conditioning unit on the mounting means 27 on the tongue 15; (3) couple the air conditioning unit 29 to the respective supply and return ducts 31 and 37 with the connecting ducts 87 and 89; and (4) insert suitable stud bolts 51 to retain the air conditioning unit 29 in place. Thus, all he has to do, in essence, is to plug in the air conditioning unit. He does not have the delay and expense of trying to obtain highly skilled air conditioning specialists during hot weather, such as has been previously required in the prior art for emplacing evaporating coils inside a heating closet or the like for circulation of air therepast. Moreover, all of the duct work will have been pre-formed and pre-placed at the factory so there are no expensive sheet metal specialists required, obviating the usual delay.

GENERIC CONSIDERATIONS AND OTHER EMBODIMENTS

While the conventional tongue of the mobile home is a preferred embodiment of this invention because of its inherent structural stability, being integrally welded with the main substructure by way of suitable strong beams and the like, there have been trends which make it necessary to advert to other measures. For example, many state laws have required maximum overall length of mobile home and towing vehicle. Consequently, the tongues have been shortened so severely that an air conditioner mounted on the tongue could be damaged during turns or the like when the shortened tongues are employed with the longer mobile homes, such as illustrated in FIGS. 8 and 9. Also, many local communities and trailer parks have regulations requiring landscaping of the front of the mobile home. This landscaping is more easily effected if the tongues are removable. Consequently, many mobile home manufacturers provide a removable tongue, such as illustrated in FIGS. 8 and 9. Many such trailer parks require the air conditioning units to be moved from view from the front of the mobile home. Accordingly, it is frequently advantageous and this invention employs a pre-braced and pre-prepared installation site, or predetermined first location, at which an external frame can be attached readily to the mobile home for supporting the air conditioning unit. The home's internal distribution system is connected with external connection means located at the predetermined first location to facilitate subsequent interconnection of an external air conditioning unit installed on the attached external frame. This embodiment, in combination with apparatus for reducing the heat load on the ceiling of the mobile home, as described in the patent application Ser. No. 306,169, cited hereinbefore, is disclosed in FIGS. 8 and 9. The descriptive material of the above referenced Ser. No. 306,169 is incorporated herein by reference for details that may be abbreviated in the following descriptive matter.

Referring to FIGS. 8 and 9, the mobile home 11 has a conventional main substructure 91 defining the sub-floor duct 25 (similarly as described with respect to FIG. 1); the tongue 15; the wheels 13; the conditioned air distribution means, such as the aforementioned attic duct 23 and sub-floor duct 25; similarly as described with respect to FIGS. 1 and 2. Similarly as described hereinbefore, the tongue 15 has a front support means, such as a jack 93, operated similar as and serving the same purpose as the front support wheel 17 described hereinbefore.

Mobile home 11 has an external frame 95 that is adapted for carrying an air conditioning unit 29 and a structural attaching framework 97 for attaching the external frame 95 to the substructure of the mobile home.

The structural frame 95 may comprise any suitable framework having adequate strength. The structural frame 95 will have adequate length and width to support the air conditioning unit 29. For example, it may be designed specifically for the air conditioning unit 29 and be substantially rectangular in plan. It has been found particularly advantageous in this invention, however, to employ a removable tongue that can also serve as the external frame 95 when bolted onto the rear of the mobile home at the structural attaching framework 97. This is indicated by the jack 93 being shown in dashed lines in FIG. 9. Obviously, the tongue 15 will only be employed as the external frame 95 where it has adequate length to support the air conditioning unit 29 thereon. Because of the aforementioned state and local regulations, many mobile home manufacturers already employ demountable tongues 15 that can be readily bolted onto the front end of the mobile home for towing forwardly long distances.

The structural attaching framework 97 may comprise any of the conventional structural frameworks such as are employed in attaching demountable tongues 15. For example, suitable channel iron may be affixed, as by welding, to the longitudinally extending beams of the main substructure 91 and have suitable bolts welded therethrough for affixing the large nuts 99 over mounting brackets on the external frame 95. This type of construction is particularly easy where demountable tongues are employed and the vehicle can be towed from either end such that the rear of the trailer house 11 may become a pseudo-front end for towing, particularly over short distances. The structural attaching framework 97 is pre-formed at the predetermined first location, such as the rear end of the exterior of the mobile home and is connected with the main substructure 91 with suitable structural strength to support both the external frame and the air conditioning unit 29.

In any event, the external frame 95 has the mounting means 27 thereon. The mounting means 27 will be any suitable mounting means, as described hereinbefore and hereinafter that will serve to affix the air conditioning unit 29 to the structural frame 95 and facilitate connecting it with the external connection means 41.

The rear end of the mobile home has a vertical duct 33 and its external connection means 41, and a supply duct 31, similarly as described with respect to FIGS. 1-3. The mobile home 11 also includes another external connection means 41, and a return duct 37 that is connected with the return air means in the form of a sub-floor duct 25, similarly as described hereinbefore. The respective external connection means 41 may have caps 43 before being connected with the air conditioning unit 29, as described hereinbefore.

The air conditioning unit 29 has the same parts as delineated hereinbefore that functionally serve the same purpose and are connected with the respective supply and return ducts 31 and 37 by way of suitable coupling ducts 87 and 89.

In the embodiment of FIGS. 8-10, similarly as described in my co-pending and aforementioned application Ser. No. 306,169, the mobile home 11 also includes, as apparatus for reducing the heat load on the mobile home and, consequently, on the air conditioning unit 29, at least one fresh air entrance vent 113 in communication with an attic portion 115, a downcomer duct 117, a powered blower 119, FIG. 10, and an actuation means, such as the temperature sensor and thermostat 121, for effecting operation of the powered blower 119. The attic portion 115 of the mobile home 11 is permeable to the flow of air therethrough; for example, longitudinally of the mobile home 11 through the open trusses 123 that support the roof 125 of the ceiling 127.

The fresh air vent 113 may comprise one or more air entrance louvers disposed peripherally about the attic portion 115 is desired. Each of the entrance louvers is disposed beneath a weather overhang so as to prevent entrance of precipitation thereinto. As illustrated in FIGS. 8 and 9, a main entrance vent 113 is disposed at the front end beneath the overhang 129. If desired, of course, suitable screens may be provided in conjunction with the louver to prevent insects and the like from getting into the attic portion. Covers may be provided for towing.

The downcomer duct 17 may have any shape. As illustrated, however, the downcomer duct 17 is shown as cylindrical, since the cylindrical tubular ducts are frequently advantageous in taking advantage of small spaces in mobile homes, as in the corner of a closet. In any event, the downcomer duct 17 is connected with the attic portion at a second location 131 that is removed from the air entrance vent 113. Thus, fresh air that comes in through the fresh air entrance vent 113 traverses substantially completely throughout the attic portion 115 in flowing to and down the downcomer duct 17. In the process of flowing through the heated attic portion 115, the fresh air becomes relatively hot, or heated. The heated fresh air is flowed downwardly through the downcomer ducts 17, through the powered blower 119 and discharged exteriorly of the mobile home; for example, out of aperture 132, FIG. 10.

As described in the aforementioned Ser. No. 306,169, the downcomer duct may be advantageously passed through closets and the like in humid climates without insulation to provide heat to prevent mildew and fungus from forming on articles in the closet. If desired, on the other hand, the downcomer duct may be provided exteriorly of the mobile home.

The powered blower 119 is connected at its suction side 137 with a heated air aperture 139 that is in turn connected with the external connection means 41 that is connected with the downcomer duct 117. A cylindrical duct 141 interconnects the external connection means 41 and the heated air aperture 139 of the compartment 143 housing the powered blower 119. The compartment 143 is sealed when its top (not shown and removed for purposes of illustration) is inserted on the air conditioning unit 29 so as to define a heated air passageway therethrough. If desired, the powered blower 119 and its compartment 143 may be provided separately from the air conditioning unit 29, although I have found it advantageous to combine the two in larger units.

The powered blower 119 discharges the heated fresh air through the discharge aperture 132, illustrated as penetrating through the end of the compartment 143, although it may be through the top, bottom or rear side. As illustrated, the aperture 132 discharges the air away from the condenser blower and, hence, increases the efficiency of the overall unit.

As described in the aforementioned patent application, a static differential pressure of about ¼ inch of water between the interior of the attic portion and the higher pressure interiorly of the mobile home 11 effects a satisfactory reduction in heat transfer without creating too great a flow of cool air from within the interior of the mobile home into the attic portion 115 or too much stress on the roof or ceiling. Also as described in my co-pending patent application, a differential pressure controller may be employed to control the speed of the powered blower to maintain the proper differential pressure; although this is not essential with a properly designed powered blower.

The powered blower 119 may comprise any of the conventionally available blowers and motors that are capable of moving a relatively high velocity stream of air and creating the critical static differential pressure in the attic portion 115, as described in the cited patent application Ser. No. 306,169. As denoted therein, I have found it advantageous to employ high speed squirrel cage blowers driven by electric motors; although staged fans may be employed to do the same job. Both the high speed squirrel cage blowers driven and the staged fans, as well as their electric motor drives, are commercially available from General Electric Company. Consequently, they need not be described in greater detail herein.

The temperature sensor and thermostat 121 is disposed so as to sense the temperature in the attic portion 115. The temperature sensor and thermostat 121 are connected with a suitable source of power; for example, a 12 volt alternating current; and with blower controls by electrical conductors, illustrated by conductor 135, such that the blower motor is automatically energized when the temperature in the attic portion 115 is greater than a predetermined and pre-set temperature. If desired, the thermostat may be mounted in the ceiling so as to be accessible from the interior of the mobile home, yet sense the temperature in the attic portion and be settable; for example, may be set within the range of from 80°-120°F. On the other hand, a remote temperature sensor may be employed with a factory pre-set thermostat, as in a conventional furnace such that the blower will automatically come on at some pre-set temperature; for example, about 85°F as employed in a conventional furnace. In this way, economical temperature sensors and thermostats that are conventionally available may be employed to energize the blower intermittently and when needed, instead of having the blower run continuously.

In operation, the fresh air entrance vent 113 is installed in the front of the mobile home if not already pre-existing. The downcomer duct 117, the blower 119 and the discharge aperture 132 are installed by sliding the compartment 143, alone or integral with air conditioning unit 29, into place on the mounting means 17 on the external frame 95. In the integral units, the connection by way of the cylindrical duct 141 is made at the same time that the air conditioning cylindrical ducts are interconnected when the air conditioning unit is installed on the mounting means 27. Thereafter, as the attic portion 115 begins to be heated from the rays of the sun and the temperature reaches a pre-set temperature in the thermostat, the blower 119 is energized to such fresh air in through the attic portion to pick up the heat and prevent imposition of a high heat load onto the ceiling 127 and, consequently, the interior of the mobile home 11. Ordinarily, the blower 119 may run continuously if the roof 125 of the mobile home 11 is exposed to the sun's rays on a hot sunny day. If, on the other hand, the temperature in the attic portion 115 is reduced below the pre-set temperature, the blower 119 will be deenergized until the temperature again exceeds the pre-set temperature. If desired, a manual bypass switch S may be provided for the temperature sensor and thermostat, in lieu of an adjustable thermostat such that the blower 119 runs continuously when the manual switch is energized.

The air conditioning unit operates responsive to suitable thermostat and interior controls similarly as described with respect to FIGS. 1–3 hereinbefore.

On the other hand, the powered blower 119 may be interconnected with the air circulation blower, or evaporator fan, 79 so as to be turned on and off only when the evaporator fan 79 is turned on and off; or to run continuously when the evaporator fan runs continuously for circulating the air within the mobile home.

Ordinarily, the condenser fan is turned on and off when the refrigeration compressor in the air conditioning unit 29 is turned on and off and may be operated independently of the evaporator fan and the powered blower 119.

The flexibility introduced by being able to mount the tongue at either the front end or the rear end of the mobile home has been found unusually effective, particularly for short term moves. Moreover, the combination of the use of the powered blower 119 to reduce the heat load enables saving as much as $20.00 a month in cooling bills on relatively large mobile homes, together with conserving an equivalent amount of energy. The flexibility of having the demountable tongue, whether or not it be remountable as the external frame or whether a different external frame be used, enables the mobile home operator to tow his mobile home in any state and park it in any mobile home park regardless of the state and local regulations. In fact, many moves may be made in such locales with a tongue and air conditioning unit mounted on the rear of the mobile home; in effect towing the mobile home backwards.

In other embodiments, it may be desirable to employ a panel 91, FIG. 6, having the respective external connection means 41 with flexible means, such as the ells 93 and 95, for connecting into the respective pre-existing ducts, such as a plurality of ducts beneath the floor of the mobile home 11.

If desired, the air conditioning unit 29 may comprise merely a cooling unit as is conventionally done. On the other hand, the air conditioning unit 29 may comprise a heat pump so as to supply supplemental heat in the winter and to supply the necessary cooling in the summer. In fact, in the milder climates, the heating capabilities of the heat pump may be sufficient such that no other heating will be required.

The ducts that have been described hereinbefore may be formed of any suitable materials. I have found it convenient to employ sheet metal duct work. The ducts can be pre-formed plastic ducts or the like such as may be conventionally employed in mobile home construction.

Appropriate and conventional insulation will be employed in or around the respective ducts and the conditioned air passageways in the air conditioning unit 29, mobile home 11 and the respective interconnections therebetween. This helps appreciably to reduce the load in heating and cooling the mobile home 11.

While use of bolts and nuts in registry have been described hereinbefore in the respective mounting and retainer means for mounting and retaining the air conditioning unit 29 on the tongue 15, any other means may be employed. For example, straps may be employed over the air conditioning unit and connected to a suitable mounting means, such as brackets, on the tongue 15. If desired, side brackets may be affixed to the cabinet of the air conditioning unit 29 and connected with coengaging brackets on the tongue 15. Any other suitable mounting and retainer means may be employed as desired.

The materials ordinarily employed in this art may be employed herein and no exotic or expensive new materials are necessary.

From the foregoing descriptive matter it can be seen that this invention provides the following desirable features. The mobile home buyer has the option of buying an air conditioning unit initially or subsequent to the initial purchase. Even older mobile homes may be converted with simple panels with external connection means. The air conditioning unit does not take up inside floor space which is at a premium in a mobile home. The subsequent installation of an air conditioning unit is made easy by factory installed accessories with external connection means such that the air conditioning unit may be simply plugged into place. The air conditioning unit that is installed may be an air conditioning unit alone or a combination heating and cooling unit commonly referred to as a heat pump; with or without supplemental forced attic ventilation. If the air conditioning unit develops trouble, it may be unplugged and taken to a service depot to obtain factory authorized service without having to move the mobile home or to wait for a service specialist to find time to call on the mobile home. By having the air conditioning unit mounted externally on the tongue, much noise is eliminated. In park areas, the hot air from the condenser coil does not blow onto the sides of the neighbor's houses, flower beds, or the like. The air conditioning unit 29 is well above the ground level so that it is not flooded by high ground water, such as from heavy rains, or the like. The air conditioning unit that is mounted on the tongue ordinarily does not have to be disconnected when the mobile home is moved. Moreover, there is no special foundation, scaffolding or the like required when a mobile home is parked at its new location.

Thus, it can be seen that this invention provides all of the objects delineated hereinbefore and has many unique and unobvious advantages over conventional installations.

Although this invention has been described with a certain degree of particularity, it is understood that the disclosure has been made only by way of example and that numerous changes in the details of construction and the combination and arrangement of parts may be resorted to without departing from the spirit and the scope of this invention.

What is claimed is:
1. In a mobile home having:
 a. a main substructure for support;
 b. a tongue on said main substructure for being towed;
 c. wheels on said main substructure for mobility;
 d. a body on said main substructure and defining a space for living therewithin;
 e. a conditioned air distribution means in said body for circulating conditioned air therewithin; and
 f. a return air means in said body for returning air that has been circulated; the improvement comprising:
 g. an external frame;
 h. structural attaching framework for attaching said external frame to said mobile home; said structural attaching framework being pre-formed at a predetermined first location on the exterior of said mobile home and being connected with said main substructure with strength adequate to support said external frame and a predetermined and coconnectable external air conditioning unit;
 i. mounting means on said external frame for mounting said external air conditioning unit;
 j. a supply duct connected with said conditioned air supply distribution means and terminating in an external supply connection means that is adapted for connection with said external air conditioning unit; and
 k. a return duct connected with said return air means and terminating in an external return connection means that is adapted for connection with said external air conditioning unit;
whereby said air conditioning unit may be installed subsequently by the mobile home owner by simply attaching said external frame if not already attached, mounting said air conditioning unit on said external frame via said mounting means and connecting respective inlet and outlet ports of said air conditioning unit with said return and supply connection means without requiring expensive, difficultly obtainable skilled help, such as an air conditioning specialist.

2. The mobile home of claim 1 wherein a plurality of respective cap means are connected to said external supply and return connection means prior to installation of said air conditioning unit.

3. The mobile home of claim 1 wherein said air conditioning unit is mounted on said external frame via said mounting means; said air conditioning unit having retainer means that co-engage said mounting means, and having respective inlet and outlet ports that are aligned closely with respective said return and supply connection means; a first short coupling interconnects said inlet port with said return connection means and duct; and a second short coupling interconnects said outlet port with said supply connection means and duct.

4. The mobile home of claim 3 wherein said mobile home includes apparatus for reducing the heat load on said mobile home; said mobile home having intermediate its ceiling and roof an attic portion that is permeable to the flow of air therethrough, said apparatus comprising:
 a. at least one fresh air entrance vent disposed at a second location in communication with said attic portion; said fresh air entrance vent being disposed so as to prevent entrance of precipitation into said mobile home;
 b. downcomer duct for effecting reverse flow of air; said downcomer duct being connected with said attic portion at a third location removed from said second location and disposed such that the fresh air coming in through said fresh air entrance vent traverses substantially completely through said attic portion in flowing from said second location to said third location to pick up heat and lower the heat load imposed on said ceiling; said fresh air becoming heated in the process;
 c. a powered blower disposed in said air conditioning unit and connected at its suction side with said downcomer duct for sucking said fresh air through said fresh air entrance vent, said attic portion, and said downcomer duct and discharging the heated air exteriorly of said mobile home; and
 d. start and stop controls connected with said powered blower and inside said mobile home such that said powered blower is energized to circulate air through said attic portion and reduce the heat load on said mobile home.

5. The mobile home of claim 1 wherein said tongue forms said external frame and has said mounting means thereon.

6. The mobile home of claim 5 wherein said tongue is integrally connected with said main substructure via said structural attaching framework and said first location is at the front end of said mobile home.

7. The mobile home of claim 5 wherein said first location is at the rear end of said mobile home and said tongue is de-mountable and remountable on said structural attaching framework at the rear of said mobile home for complying with local regulations.

8. The mobile home of claim 1 wherein said mobile home includes apparatus for reducing the heat load on said mobile home; said mobile home having intermediate its ceiling and roof an attic portion that is permeable to the flow of air therethrough, said apparatus comprising:
 a. at least one fresh air entrance vent disposed at a second location in communication with said attic portion; said fresh air entrance vent being disposed so as to prevent entrance of precipitation into said mobile home;
 b. downcomer duct for effecting reverse flow of air; said downcomer duct being connected with said attic portion at a third location removed from said second location and disposed such that the fresh air coming in through said fresh air entrance vent traverses substantially completely through said attic portion in flowing from said second location to said third location to pick up heat and lower the heat load imposed on said ceiling; said fresh air becoming heated in the process;
 c. a heated air duct connected with said downcomer duct and terminating in an external heated air connection means that is adapted for connection with said external air conditioning unit; said external heated air connection means being disposed adjacent said external supply and return connection means at said first location so as to be connectable with respective ports on said air conditioning unit; and
 d. start and stop control disposed within said mobile home and having electrical connections for connecting with an external powered blower for energizing said blower and circulating fresh air through said attic portion to reduce the heat load on said mobile home.

9. The mobile home of claim 8 wherein a plurality of respective cap means are connected to said external supply, return and heated air connection means prior to installation of said air conditioning unit.

10. An air conditioning unit that is adapted for installation on a tongue of a mobile home that has a jack-up support means and a plurality of external connection means connecting to respective supply and return air distribution means for circulating air within said mobile home comprising:
 a. weather-resistant cabinet enclosing a self-contained, closed system including a refrigerant, a compressor, a condenser coil connected with said compressor for liquefying compressed said refrigerant gas, evaporator coil connected with said condenser coil for cooling air circulated within said mobile home and evaporating said refrigerant, said evaporator coil being connected with said compressor for returning the evaporated refrigerant thereto for compression; a condenser fan for circulating external air past said condenser coil; an evaporator fan for circulating the air to be circulated within said mobile home past said evaporator coil for cooling; said cabinet defining external air circulation path past said condenser coil and said condenser fan and defining internal conditioned air circulation path past said evaporator coil and said evaporator fan;
 b. retainer means adapted to co-engage said mounting means for mounting said air conditioning unit thereon;
 c. inlet and outlet ports connected to the respective terminal ends of said internal conditioned air circulation path of said cabinet; said inlet and outlet ports being disposed at the rear of said air conditioning unit and spaced in relation to each other and to said retainer means so as to approximately align with respective external connection means on said mobile home; and
 d. respective couplings for connecting said inlet and outlet ports with respective said external connection means on said mobile home.

11. The air conditioning unit of claim 10 wherein said mobile home also has intermediate its ceiling and roof an attic portion that is permeable to the flow of air therethrough, a fresh air entrance vent disposed at a second location in communication with said attic portion, a downcomer duct for effecting reverse flow of air, the downcomer duct being connected with said attic portion at a third location removed from said second location and disposed such that the fresh air coming in through said fresh air entrance vent traverses substantially completely through said attic portion in flowing from said second location to said third location to pick up heat and lower the heat load imposed on said ceiling; said fresh air becoming heated in the process; and an external heated air connection means is connected with said downcomer duct; wherein a heated air passageway is provided through said cabinet and terminates, respectively, in a heated air intake port and a heated air discharge port; said heated air intake port being adapted for connection with said heated air external connection means on said mobile home; and a separate heated air powered blower is disposed in said air conditioning unit and connected at its suction side with said heated air intake port for sucking fresh air through said fresh air entrance vent, said attic portion and said downcomer duct and at its discharge side discharging the heated air exteriorly of said mobile home through said heated air discharge port.

* * * * *